United States Patent [19]
Cameron

[11] Patent Number: 5,560,655
[45] Date of Patent: Oct. 1, 1996

[54] ELECTRICAL CONDUIT COUPLING WITH LUBRICATION FITTING

[76] Inventor: Ricki T. Cameron, Box 321, Pinehurst, Id. 83850

[21] Appl. No.: 393,122

[22] Filed: Feb. 16, 1995

[51] Int. Cl.$^6$ .................................................. F16L 35/00
[52] U.S. Cl. .................. 285/39; 285/94; 285/120; 285/179; 285/341; 285/383; 285/906; 285/915; 285/423; 184/15.2; 254/134.3 FT; 405/154
[58] Field of Search ..................... 285/383, 906, 285/94, 39, 120, 179, 341, 915, 423; 184/15.1, 15.2; 254/134.3 FT; 405/154

[56] References Cited

U.S. PATENT DOCUMENTS

| | | | |
|---|---|---|---|
| 1,800,085 | 4/1931 | Kroeger et al. | 285/383 X |
| 1,889,868 | 12/1932 | Montgomery | 285/383 X |
| 2,135,320 | 11/1938 | Bovard | 285/94 X |
| 2,146,100 | 2/1939 | Walch | 285/906 X |
| 2,448,232 | 8/1948 | Muse | 285/94 X |
| 2,735,699 | 2/1956 | Chadbourne | 285/383 X |
| 3,459,156 | 8/1969 | Harter | 184/15.1 X |
| 3,565,213 | 2/1971 | Heller | 184/15.2 X |
| 3,605,947 | 9/1971 | Salerno et al. | 184/15 R |
| 4,331,322 | 5/1982 | Woodruff | 254/134.3 |
| 4,569,420 | 2/1986 | Pickett | 184/15.1 |
| 4,573,715 | 3/1986 | Armbruster | 285/94 |
| 4,688,762 | 8/1987 | DeBeradinis | 254/134.3 |

FOREIGN PATENT DOCUMENTS 75338   1/1919   Austria ............................ 285/383

*Primary Examiner*—Dave W. Arola
*Attorney, Agent, or Firm*—Wells, St. John, Roberts, Gregory & Matkin P.S.

[57] ABSTRACT

The present electrical conduit coupling includes an electrical conduit coupling 10 and a lubrication fitting 11 thereon. The coupling includes a hollow body 12 including an external surface 13 and an internal surface 14. The internal surface defines a central bore 15 extending between first and second open ends 17, 19 that are adapted to receive conduit ends. A thickness dimension exists through the hollow body between the internal and exterior surfaces 13, 14. The lubrication fitting 11 is provided on the hollow body 12 between the first and second ends 17, 19. The fitting 11 extends at least partially through the thickness dimension to communicate with the central bore 15. The lubrication fitting 11 includes an internal one way valve 31 that permits injection of a lubricant into the central bore 15 but automatically closes to prevent reverse flow of lubricant outwardly through the fitting 11.

17 Claims, 6 Drawing Sheets

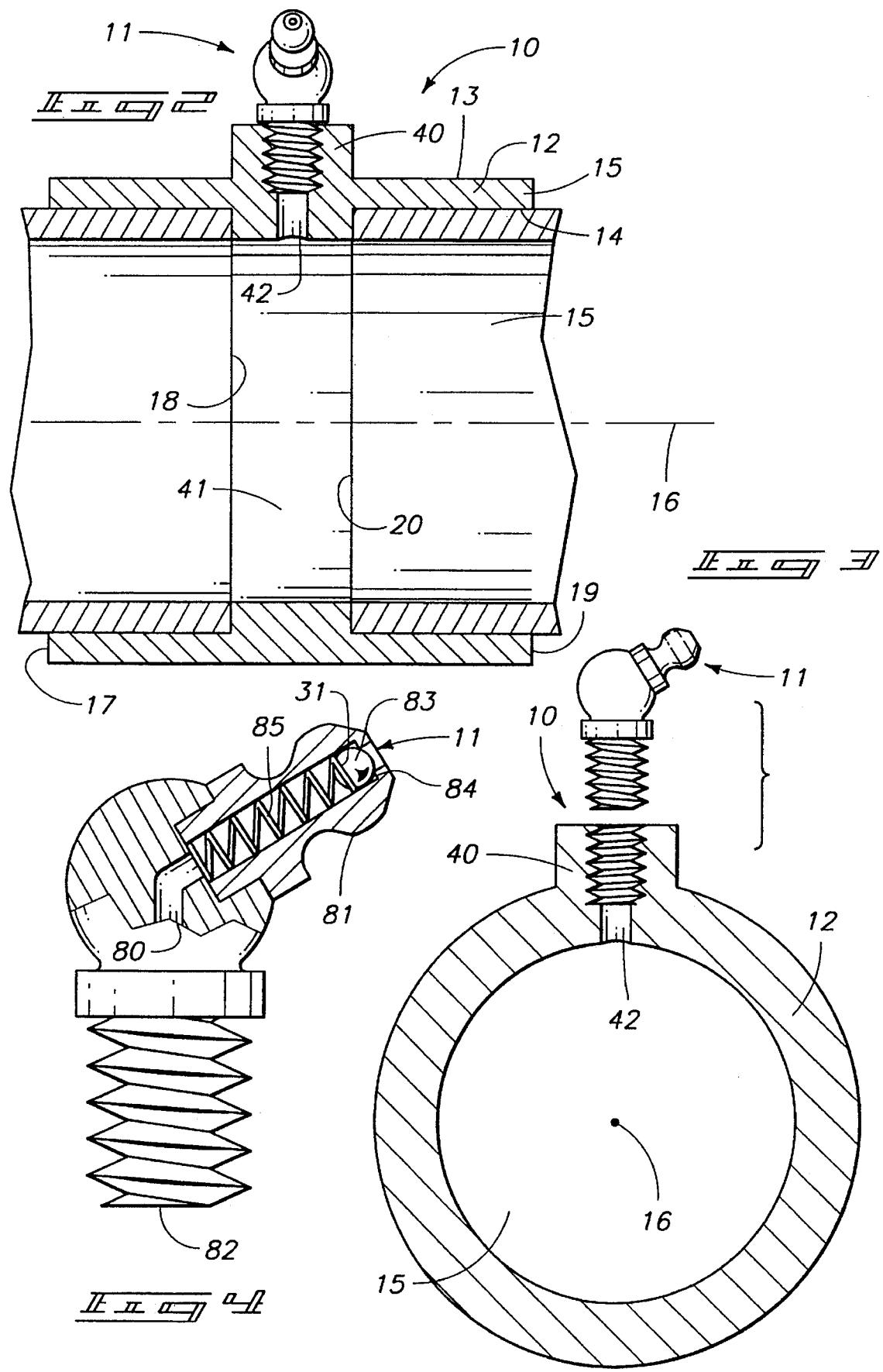

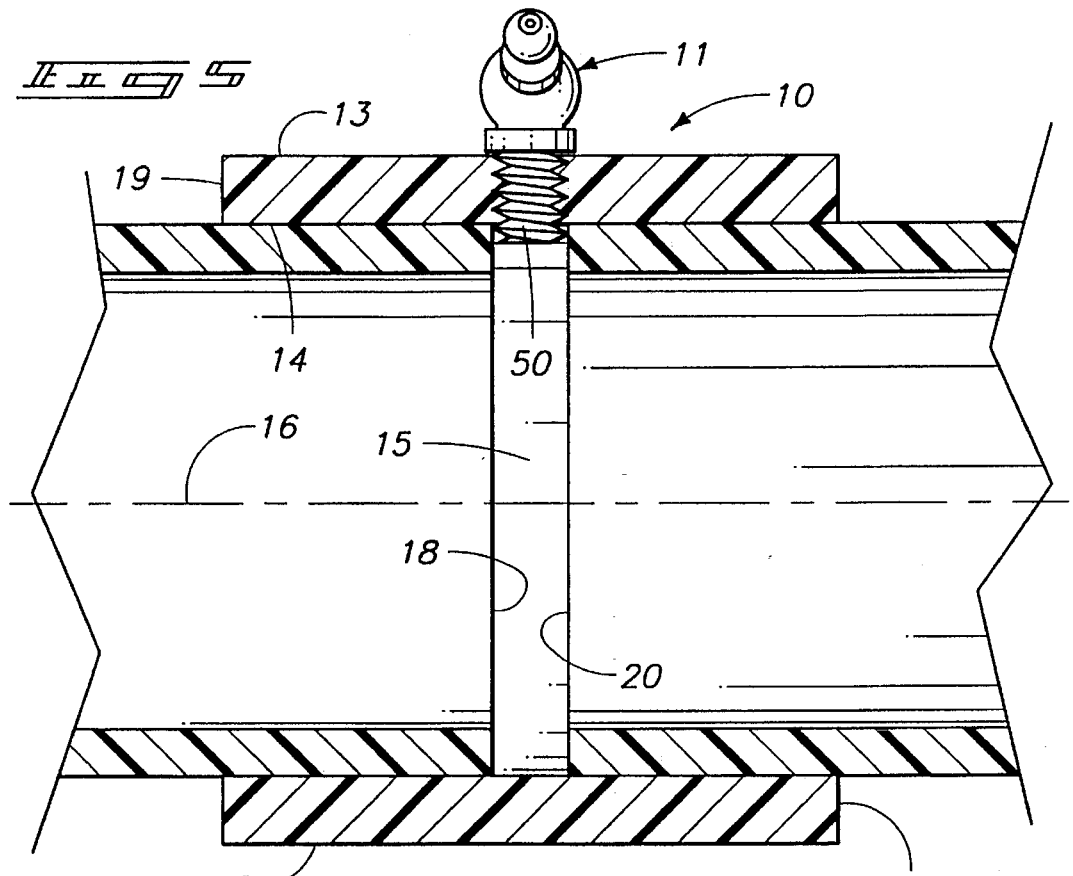
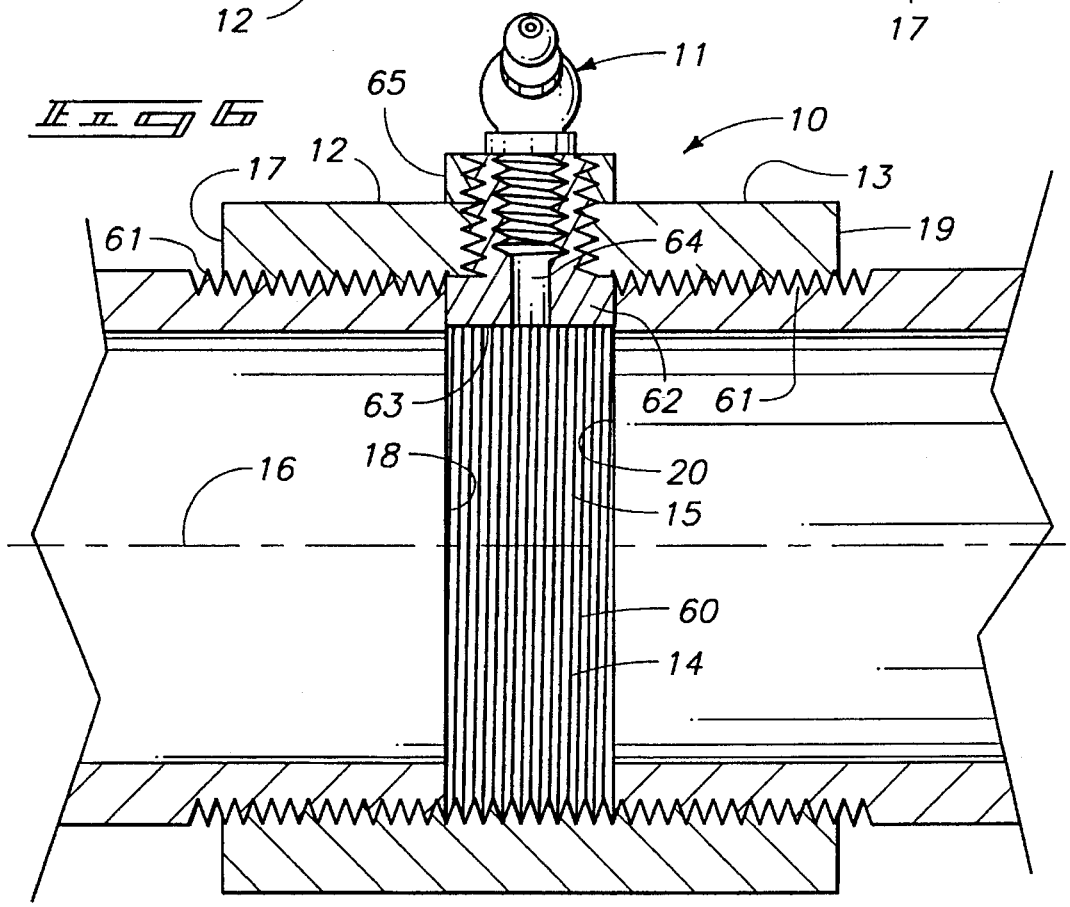

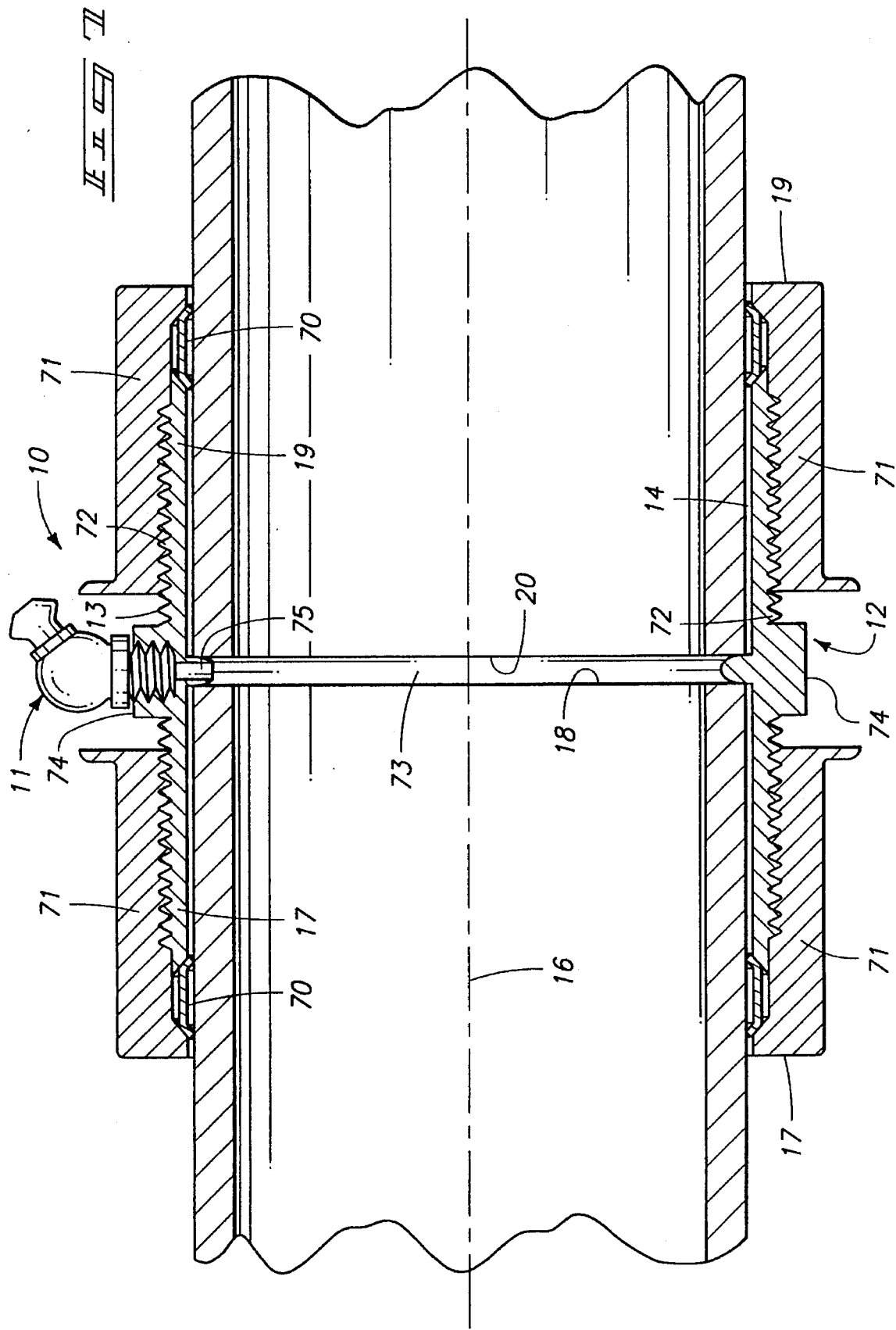

ELECTRICAL CONDUIT COUPLING WITH LUBRICATION FITTING

TECHNICAL FIELD

The present invention relates to lubrication of electrical conduit to facilitate movement of electrical wires therethrough.

BACKGROUND OF THE INVENTION

Long runs of electrical conduit are used to contain and protect one or more electrical wires in areas where the wires need the protection such conduit offers. The conduit is typically formed of sections joined by couplings and often includes bends along the conduit length. The conduit usually extends between junction boxes where wires contained within the conduit are electrically connected to components for transmission of electricity.

In electrical installations, the conduit is first assembled between junction boxes before the wires are then pulled through the conduit length. While various powered pullers are used for this purpose, it is often a difficult process to pull the wire through the conduit, especially if there are many bends along the conduit length. It is not unusual that the puller cords break, leaving a partially pulled wire end very difficult to access within the conduit length.

Lubricants have been developed to decrease the frictional resistance to movement of the wires through conduit. This lubricant is similar in consistency to automotive grease and is typically deposited into the conduit at the upstream end from which the wires are to be pulled.

The lubricant is certainly beneficial to the pulling process, but often rubs off the wire long before the pulled wire end reaches its destination. Thus the beneficial effects of the lubricant is short lived and the difficulty in pulling the wire reoccurs.

Another problem faced by electricians applying lubricant to conduit ends is the mess caused by feeding the lubricant, usually by hand, into the conduit. Much of the lubricant typically spills over the end of the conduit and into the associated junction box where it must later be cleaned up. This process is time consuming and therefor expensive to the electrical contractor.

The above problems are addressed to limited degree in U.S. Pat. No. 4,688,762 to DeBeradinis. This patent discloses a method for lubricating conduit in which couplings along the conduit length are provided with removable plugs. The plugs are removable to enable insertion of lubricant at points along the conduit length.

While this method serves to provide access for lubricant along the conduit length, the plugs must first be removed, and then replaced after the lubricant is injected. This is a time consuming task and can take longer to accomplish than the original method of simply manually inserting the lubricant at the upstream end of the conduit.

Further, removable plugs require that the electrician or helper remember to replace the plugs following removal. If a plug is not replaced, the interior of the conduit and contents are exposed to the very hazards the conduit is used to protect against.

A further problem is that the plugs must be situated on the upward side of the conduit to avoid the lubricant falling or draining back out. This becomes a significant problem, especially in confined areas. Such confined areas also restrict use of the tools required to remove and replace the plugs.

Another attempted solution to the problem is addressed by Salerno et al in U.S. Pat. No. 3,605,947. Here, hollow frangible disks filled with lubricant are placed within couplings between adjacent ends of joined conduit sections. The intent was to burst the disks, freeing the lubricant as the wires are drawn through the conduit. However, the disks themselves present obstructions to passage of the puller cord, as well as the broken membranes previously used to contain the lubricant.

Also, most pullers make use of air pressure to initially push a ball or other object of similar diameter to the conduit to "snake" an attached puller cord through the conduit. This process normally requires that the conduit be free of obstruction. Otherwise air pressure would build within the conduit between the ball and the first frangible disk as the ball progresses along the conduit. Thus progressively increasing air pressure becomes required to drive the ball ahead.

A ball encountering a disk would either be stopped or would burst the disk. The lubricant from a burst disk would then hinder further passage of the ball, being pushed ahead of the ball to the next disk where the same difficulty would again occur.

The present invention includes as an objective provision of a self closing lubricating fitting on a conduit coupling that facilitates quick injection of lubricant along the conduit interior at any angle.

Another objective is to provide such a coupling and fitting that leaves the interior of the conduit unobstructed and thereby facilitates free normal passage of puller cord and wire therethrough.

A still further objective is to provide a process for lubricating the interior of electrical conduits in a fast an effective manner, while the conduit remains substantially closed except for the open ends thereof.

These and further objects and advantages will be understood from the following description.

BRIEF DESCRIPTION OF THE DRAWINGS

Preferred embodiments of the invention are described below with reference to the accompanying drawings, which are briefly described below.

FIG. 2 is a longitudinal sectional view of the embodiment shown in FIG. 1;

FIG. 3 is an exploded transverse sectional view thereof;

FIG. 4 is an enlarged, fragmented view of a lubrication fitting used in preferred forms of the present invention;

FIG. 5 is a sectional view through a second preferred form of the invention with conduit ends mounted thereto;

FIG. 6 is a sectional view through a further preferred form of the invention with conduit ends mounted thereto;

FIG. 7 is a sectional view through another preferred form of the invention with conduit ends mounted thereto;

DETAILED DESCRIPTION OF THE PREFERRED EMBODIMENTS

Figure 1:
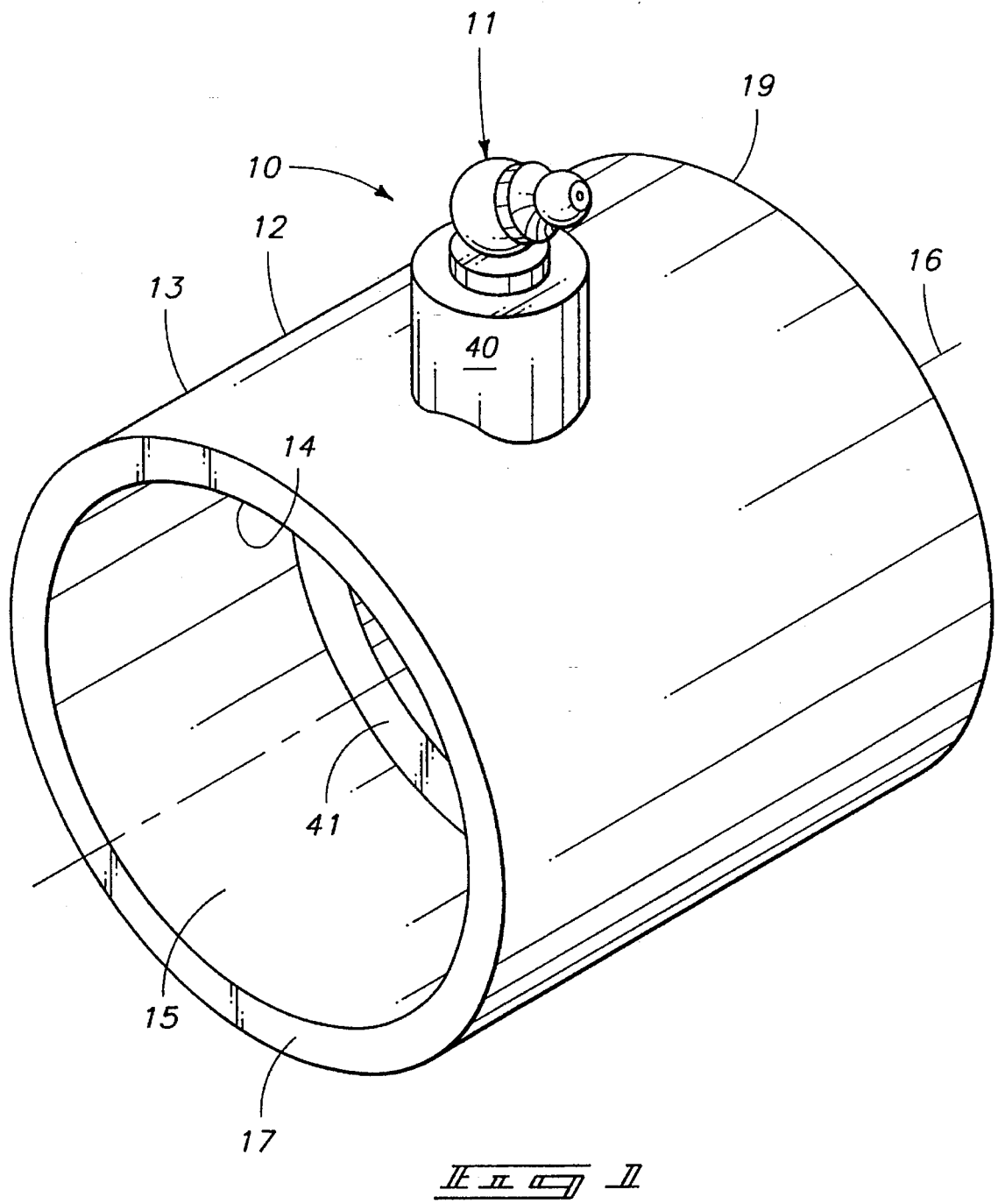
FIG. 1 is perspective view of a coupling and lubrication fitting of a first preferred form of my invention.

This disclosure of the invention is submitted in furtherance of the constitutional purposes of the U.S. Patent Laws "to promote the progress of science and useful arts" (Article 1, Section 8).

The present invention is intended for use to aid pulling of electrical wires through electrical conduit by enabling injection of lubricant at selected locations along the conduit length.

All embodiments of the present invention include an electrical conduit coupling 10 and a lubrication fitting 11 thereon. The coupling is formed as a hollow body 12 including an external surface 13 and an internal surface 14. The internal surface defines a central bore 15 formed along a conduit axis 16 and extends along the axis between a first open end 17 adapted to receive a first conduit end 18, and a second end 19 adapted to receive a second conduit end 20. A wall thickness dimension exists through the hollow body between the internal and exterior surfaces 13, 14. The conduit ends 18, 20 also include a prescribed wall thickness dimension (measured radially to the axis 16) that is typically uniform along the conduit lengths, The lubrication fitting 11 is provided on the hollow body 12 between the first and second ends 17, 19. The fitting 11 includes a shank 50 that extends at least partially through the wall thickness dimension of the hollow body 12 to communicate with the central bore 15. The lubrication fitting 11 includes an internal one way valve 31 (FIG. 4) that permits injection of a lubricant into the central bore 15 but automatically closes to prevent reverse flow of lubricant outwardly through the fitting 11.

The present invention is exemplified in a first preferred form in the configuration shown in FIGS. 1–3. Here the hollow body 12 is formed of plastic or a similar formable, relatively rigid material. The body 12 in this form includes an integral projection 40 extending substantially radially outwardly from the exterior surface 13.

Body 12 also includes an abutment, advantageously in the form of an internal annular shoulder 41 projecting inwardly into the bore a distance less than the wall thickness of the conduit ends 18, 20. The shoulder 41 is positioned along axis 16 between the first and second ends of the hollow body for abutment with conduit ends 18, 20 inserted into the central bore (FIG. 2).

In FIGS. 2 and 3, a hole 42 is shown, formed substantially radially through the projection 40 to open into the central bore through the shoulder 41. The hole 42 receives and mounts the lubrication fitting 11, preferably by means of threads provided on a shank 50 of the fitting, and mating threads provided along surfaces forming the hole 42.

The lubrication fitting in the first preferred form includes a threaded shank 50 that is threadably engaged within the hole 42. The axial dimension of the shank 50 is selected such that the shank will extend at least part way (radially) through the thickness dimension of the hollow body wall, but in no case is the shank to extend radially into the hollow bore beyond the interior conduit walls. This is done to eliminate any possibility that the shank 50 might block passage of the cable through the conduit.

A second preferred form of the present coupling 10 is shown in FIG. 5. Here the hollow body 12 is again preferably formed of plastic material but is of a thinner wall construction than the first embodiment. In this form, the thickness dimension (measured radially between the internal surface 14 and the exterior surface 13) is substantially consistent, and the internal surface 14 is smooth and substantially cylindrical.

In the second form, the lubrication fitting 11 includes a shank 50 having a shank length dimension that is greater than the thickness dimension of the hollow body wall. The length of the shank 50 is such that the shank projects into the central bore 15, presenting an abutment within the hollow body along the internal surface 14 for abutment with conduit ends 18, 20 inserted into the central bore. The abutment formed by the shank 50 thus prevents plastic conduit ends from closing the internal passage within the fitting and assures that the lubricant can be injected into the central bore 15.

It is noted that in the second form, the shank 50 projects into the central bore 15 by a distance that is less than the radial wall thickness dimensions of the conduit ends 18, 20. This assures that the shank 50 will not present an obstruction to passage of wires or puller cord (not shown) along the interior of the conduit. This feature is consistent with other embodiments, as discussed above in regard to the first preferred form.

In a third preferred form, the coupling 10 as shown in FIG. 6 includes an internal surface 14 provided with female threads 60 for threaded coupling with male conduit threads 61 at conduit ends 18, 20. This form of coupling may also be plastic, but is more appropriately formed of metal, most preferably cast iron.

The shank 50 of the fitting 11 in this form is effectively extended and supplemented by an abutment comprising a headed bolt 62 with the head 63 thereof positioned within the hollow body along the internal surface 14. The head 63 is positioned axially between the open ends 17 and 19 of the hollow body, for abutment with conduit ends 18 and 20 when inserted into the central bore 15 as shown in FIG. 6. In this embodiment the internal head 63 extends radially into the hollow body a prescribed distance that is less than the wall thickness of the joined conduit ends 18, 20. This is done to avoid catching the cable or pull cords during the cable pulling operation.

A hole 64 is provided through the bolt for receiving the lubrication fitting. The hole 64 is preferably threaded to threadably receive and mount the shank 50 of the fitting 11.

A nut 65 may be provided to threadably engage the bolt along the exterior surface 13. The nut 65 is used to hold the bolt 62 in place, thus avoiding the possibility that the bolt might fall into the interior of the central bore 15.

It is noted that the positions of the bolt and nut might be reversed, with the bolt head 63 being located against the exterior surface 13 and the nut 65 threadably engaging the shank of the bolt within the central bore 15 against the interior surface 14. In either manner, the nut 65 or the bolt head 63 within the bore functions as an abutment for stopping inward axial movement of the conduit ends 18, 20 and thereby leaving a clear passage for injection of lubricant.

Also, in either instance the "abutment" provided by the bolt head 63 or nut 65 includes a thickness dimension less than that of the adjacent conduit walls so as not to interfere with passage of wire or pull cable along the interior of the conduit.

It is also noted at this point that the bolt alone, or the bolt and nut combination may also be used with the other preferred embodiments described above. Further, the bolt or bolt and nut combination may also be used with the embodiments described below.

A fourth preferred form of the coupling 10 is shown in sectional view in FIG. 7. Here the hollow body is formed similar to the standard forms of compression couplings used with aluminum "EMT" type conduit. The hollow body 12 of this form is thus preferably comprised of aluminum, though other appropriate materials could be used.

Compression rings 70 are used in this form, to be selectively compressed against conduit ends 18, 20 by threaded nuts 71 at the first and second ends 17, 19 of the hollow body 12. The opposed ends of the hollow body are threaded at 72 to receive the nuts 70.

An abutment is provided within the central bore 15 of the fourth preferred embodiment, in the form of an inwardly projecting annular shoulder 73. The shoulder 73 functions as other abutments described above, to stop axial inward movement of the conduit ends 18, 20.

An annular polygonal tool engaging surface 74 is provided on the exterior surface 13 of the hollow body 12 in the fourth embodiment, advantageously disposed radially outward of and axially centered over the internal shoulder 73.

The lubrication fitting 11 is mounted to the annular polygonal tool engaging surface 74 within a substantially radial hole 75 formed through the thickness dimension of the body and opening into the central bore 15 through the shoulder 73. The shoulder 73 prevents the conduit ends from coming into abutment over the hole 75 and thus keeps the hole free for passage of lubricant into the conduit.

Figure 9:
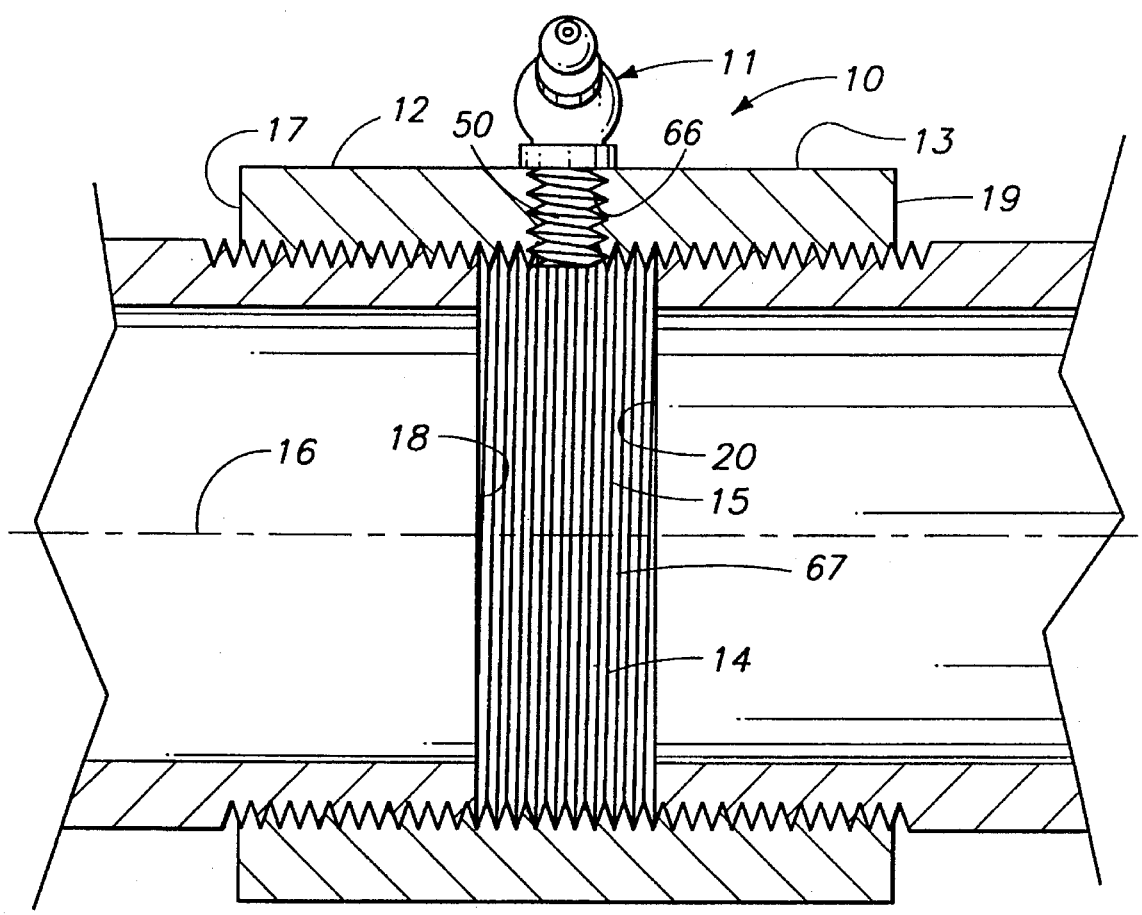
FIG. 9 is a sectional view through another preferred form of the invention for receiving threaded conduit ends.

In yet another form, as shown in FIG. 9, the hollow body 12 includes internal threads 67 that extend the full axial length of the central bore 15. The body 12 in this form may be similar to a conventional galvanized steel conduit coupling, with the exception of a threaded hole 66 formed radially through the wall thickness of the body to accept the threaded shank 50 of a fitting 11. The hole 66 is threaded to receive the threaded shank 50.

As shown in FIG. 9, the hollow body 12 threadably receives ends 18 and 20 of complimentary threaded conduits. The mating threads of the conduit and hollow body are provided as with conventional galvanized conduit and couplings, such that the conduit ends 18, 20 cannot be turned into the body to the point where they come into abutment with one another. Instead, when the conduits are turned into the hollow body and tightened, an axial space will remain between the ends 18, 20 as shown in FIG. 9. For this purpose, the threads 67 within the hollow body 12 are advantageously substantially identical to threads within conventional galvanized conduit couplings.

The hole 66 is substantially axially centered between the opposed ends 17, 19 of the body 12. The shank 50 of the fitting 11 is thus safely located by the hole 66 to avoid being clamped shut or sheared off by one or both of the conduit ends 18, 20.

The length dimension of the shank 50 in this embodiment is selected such that when the fitting 11 is properly mounted on the hollow body as shown in FIG. 9, the end of the shank 50 will not project radially past the interior surfaces of the adjacent conduit ends 18, 20.

In all embodiments described above, common forms of lubrication fittings 11 (FIG. 4) are advantageously used. The preferred fitting 11 is an automotive grease fitting. It includes a rigid body preferably formed of a metal such as steel, including an internal passageway 80 for lubricant. The passageway extends from a head 81 provided in a shape for readily receiving a standard "grease gun" dispensing socket, to an open bottom end 82.

The one way valve 31 briefly described above is provided within the fitting 11. In a preferred form, the valve 31 includes a ball 83 (FIG. 4) normally biased against an internal shoulder 84 in the fitting by a compression spring 85.

The valve will thus permit injection of lubricant inwardly through the passageway 80, but will automatically close against back or outward flow of the lubricant. Thus the valve will open under pressure exerted by pumping lubricant inwardly through the passage, but will automatically close to prevent outward flow at the instant the inward pressure becomes less than the compressive strength of the spring.

The present invention includes a process for lubricating an electrical wiring conduit formed by joining ends of conduit sections, as best described with reference to FIG. 8. The present process may be performed using any one or combination of the couplings and features exemplified above.

As an initial step, ends of successive conduit sections 90 are joined with at their ends by couplings 10 as defined above. It is pointed out, however that other, standard couplings 91 may be used in conjunction with the present couplings 10. The present couplings are placed only along the conduit length at locations where it is desired to inject lubrication.

Figure 8:
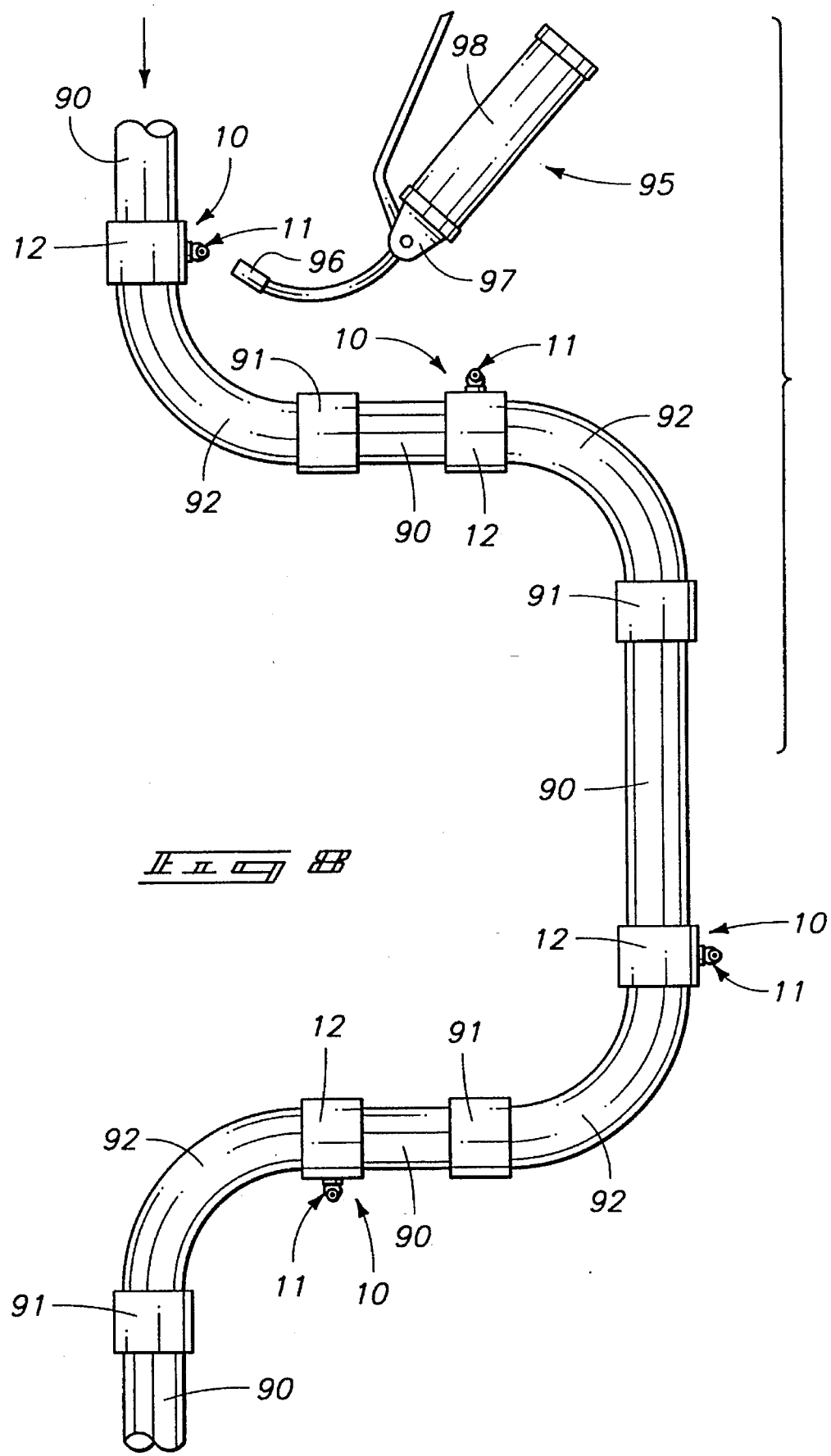
FIG. 8 is a diagrammatic view illustrating the present process for lubricating a length of connected sections of conduit.

If the conduit length includes bend sections 92 as shown in FIG. 8, one of the present couplings 10 is advantageously fitted ahead or upstream (with respect to the direction the wire is to be pulled) and adjacent to each bend section. The remaining joints may be formed with conventional couplings 91.

Assembly is accomplished using standard, well known assembly techniques that may differ depending upon the type of conduit and coupling to be used. Plastic conduit is joined to plastic couplings (as in FIG. 5), typically using adhesives. Metal conduit is joined mechanically, either by turning the threaded ends of conduit sections into the couplings (as in FIGS. 6 or 9), or by slipping the conduit ends into couplings with compression fittings as shown in FIG. 7.

In any of the configurations exemplified, the conduit ends are prevented by various means from covering the lubrication passages through the lubrication fittings. Such means vary in form with the various forms of couplings 10.

In the FIG. 5 form, the fitting shank 50 itself acts as the abutment, since the plastic conduit ends cannot damage the metal shank. In the form shown in FIG. 6, the abutment is provided by the bolt head 63 or nut 65. In the forms shown in FIGS. 1 and 7 the abutment is provided by the shoulders 41 and 73 respectively. In the form shown in FIG. 9, the abutment is integrated in the threads of the coupling that are arranged to prevent the conduit ends from being turned past the axial center of the coupling.

None of the various abutment forms project radially inward beyond the wall thickness of the adjacent conduit sections and so do not interfere with passage of wire along the conduit length.

The example illustrated in FIG. 8 simply shows a length of assembled conduit with exemplary bend sections 92. Many other configurations may be made including those without bends or with more or fewer bends. The location and number of the present couplings 10 is determined by judgement.

For example a long, straight run would require fewer couplings 10 than a run having numerous bends. Placement is determined simply by observing the areas where highest friction is likely to occur. Couplings 10 are preferably positioned just ahead of such high friction locations. Standard couplings are used at the other locations where couplings are required.

Once the conduit is assembled, the puller cord (not shown) is driven through the conduit core, using standard equipment and procedures. This step may be advantageously accomplished prior to injection of the lubricant, so the lubricant will not impede progress of the puller cord and "ball" through the conduit.

The next step includes pumping lubricant through the lubrication fittings and into the conduit. This step may be accomplished using conventional conduit lubricant such as "Yellow 77" brand lubricant produced by Ideal Industries Inc. of Sycamore Ill.

In one example, such lubricant may be placed within a conventional automotive "grease gun" injection device 95 having a lubrication fitting socket 96 and a manually operated pump 97 for pumping lubricant from a container 98.

The socket 96 is fitted to each of the lubrication fittings 11 and the pump 97 is operated until desired amounts of lubricant are injected into the conduit at the various locations where the couplings 10 have been placed.

Another step in the present process involves operating the one way valve 31 to open responsive to pumping of the lubricant through the passage 80 into the central bore 15 and to close to prevent outward escape of lubricant from within the central bore 15 through the fitting 11. This step occurs as the injection of lubricant takes place and is automatic in response to the application and relaxation of pumping pressure.

As the pump is operated to force lubricant inwardly through the connected lubrication fitting, the pressure applied by the lubricant acts inwardly against the ball 83 (FIG. 4). The ball, in turn acts against compression spring 85. If the inward pressure is sufficient, the spring will compress and allow the ball to move inwardly from its normal seated position against the shoulder 84. The passage thus opens and lubricant is permitted to flow into the conduit.

Once the pressure is decreased, as when the pumping action stops, the spring will again extend and move the ball back again against the shoulder 84 thus closing against back or outward flow of the lubricant. Thus the lubricant has no opportunity to drain back out through the fitting, and the user does not have to perform any special chores to open or close the valve as such action is automatic. Nor need there be any concern as to the angular position of the fitting 11, as there is no chance for the lubricant to fall back out from coupling once it is injected. The lubricant is thus placed in a fast, clean and effective manner.

The wire can now be pulled through the conduit, encountering the lubricant at strategic locations along the conduit run. The lubricant, at such locations serves to ease the passage of the wire.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An electrical conduit coupling, comprising:

a hollow body including an external surface and an internal surface defining a central bore formed along a conduit axis and extending between a first open end adapted to receive a first conduit end, and a second open end adapted to receive a second conduit end;

means for securing the first and second conduit ends to the hollow body;

a lubrication fitting;

means for mounting the lubrication fitting to the hollow body between the first and second ends, and communicating with the central bore;

an abutment on the lubrication fitting distinct from said hollow body and projecting into the central bore along the internal surface for abutment with conduit ends inserted into the central bore; and wherein the lubrication fitting includes an internal one way valve means for permitting injection of lubricant into the central bore through the fitting and for preventing flow of lubricant out from the central bore through the fitting without removing the lubrication fitting from the hollow body.

2. An electrical conduit coupling as claimed by claim 1 further comprising:

wherein the abutment is positioned axially between the first and second open ends for abutment with conduit ends inserted into the central bore; and a hole through the thickness dimension of the hollow body and abutment for receiving the lubrication fitting.

3. An electrical conduit coupling as claimed by claim 1 wherein the hollow body includes a wall thickness dimension between the external surface and internal surface, and wherein the lubrication fitting includes a shank length dimension greater than the thickness dimension such that the shank projects into the central bore forming said abutment within the hollow body along the internal surface for abutment with conduit ends inserted into the central bore.

4. An electrical conduit coupling as claimed by claim 1, wherein the means for securing the first and second conduit ends to the hollow body is comprised of threads along the internal surface of the hollow body, adapted to threadably receive threaded conduit ends;

wherein the hollow body includes a threaded hole opening into the central bore; and wherein the lubrication fitting includes a shank threadably engaged within the threaded hole.

5. An electrical conduit coupling as claimed by claim 1 wherein the abutment is comprised of:

a headed bolt with the head thereof positioned within the hollow body along the internal surface and positioned axially between the open ends for abutment with conduit ends inserted into the central bore; and a hole through the bolt for receiving the lubrication fitting.

6. An electrical conduit coupling as claimed by claim 1 wherein the abutment is comprised of:

a headed bolt with the head thereof positioned within the hollow body along the internal surface and positioned axially between the open ends for abutment with conduit ends inserted into the central bore;

a hole through the bolt for receiving the lubrication fitting; and a nut threadably engaging the bolt along the exterior surface.

7. An electrical conduit coupling as claimed by claim 1 wherein the lubrication fitting includes a lubrication passage formed therein and leading from an external intake end to an internal discharge end; and wherein said internal one way valve means is comprised of a spring biased ball within the lubrication passage normally biased toward a closed position to block outward passage of lubrication from within the central bore and movable to an open position, opening the passage.

8. An electrical conduit coupling as claimed by claim 1 wherein the hollow body is formed of plastic and wherein the internal surface includes substantially smooth cylindrical conduit receiving surfaces axially inwardly adjacent the first and second ends of the hollow body.

9. An electrical conduit coupling as claimed by claim 1 wherein the hollow body is formed of plastic and wherein the internal surface is substantially smooth and cylindrical inwardly adjacent the first and second ends of the hollow body, and further comprising:
- a hole through the thickness dimension of the hollow body and abutment for receiving the lubrication fitting.

10. An electrical conduit coupling as claimed by claim 1 wherein the hollow body is formed of plastic and wherein the internal surface is substantially smooth and cylindrical axially inwardly adjacent the first and second ends of the hollow body;
- a substantially radially outwardly extending projection on the hollow body;
- a hole formed through the projection and hollow body, communicating with the central bore, for mounting the lubrication fitting.

11. An electrical conduit coupling as claimed by claim 1 wherein the hollow body is formed of metal and wherein the wherein the means for securing the first and second conduit ends to the hollow body is comprised of female threaded conduit receiving surfaces on the internal surface axially inwardly adjacent the first and second ends of the hollow body.

12. An electrical conduit coupling as claimed by claim 1 wherein the hollow body is formed of metal and wherein the internal surface includes the means for securing the first and second conduit ends to the hollow body, in the form of female threaded conduit receiving surfaces axially inwardly adjacent the first and second ends of the hollow body, and wherein
- the abutment is positioned axially between the female threaded conduit receiving surfaces for abutment with conduit ends threaded into the central bore.

13. An electrical conduit coupling as claimed by claim 1 wherein the hollow body is formed of metal and wherein the internal surface includes the means for securing the first and second conduit ends to the hollow body, in the form of female threaded conduit receiving surfaces axially inwardly adjacent the first and second ends of the hollow body;
- wherein the abutment is positioned axially between the female threaded conduit receiving surfaces for abutment with conduit ends threaded into the central bore;
- a tool engaging surface on the exterior surface of the hollow body; and
- wherein the lubrication fitting is mounted to the tool engaging surface.

14. An electrical conduit coupling as claimed by claim 1 wherein the lubrication fitting is an automotive grease fitting.

15. An electrical conduit coupling as claimed by claim 1 wherein the lubrication fitting is an automotive grease fitting, having a threaded shank threadably engaging the hollow body and wherein the abutment is comprised of an inside end of the threaded shank projecting into the central bore.

16. A process for lubricating an electrical wiring conduit formed by joining ends of conduit sections, comprising the steps of:
- joining and securing ends of the conduit sections within a coupling having an internal central bore and a lubrication fitting mounted thereto with a one way valve in a passage leading into the central bore the lubrication fitting including an abutment distinct from said coupling projecting into the central bore for abutment with conduit ends inserted into the central bore;
- positioning the abutment to prevent the conduit ends from axially covering the passage within the central bore;
- pumping lubricant through the lubrication fitting and into the conduit without removing the lubrication fitting from the coupling; and
- operating the one way valve to open responsive to pumping of the lubricant through the passage into the central bore and to close to prevent outward escape of lubricant from within the central bore through the fitting.

17. A process as claimed by claim 16 for lubricating an electrical wiring conduit having a bent section comprising the further step of providing a conduit with a bent section, joining and securing said coupling on the conduit adjacent the bent section.

* * * * *